(12) United States Patent
Schmidt

(10) Patent No.: US 8,304,464 B2
(45) Date of Patent: Nov. 6, 2012

(54) POLYESTER WITH CAUSTIC MATERIAL MIXING METHODS AND MIXING REACTORS

(75) Inventor: Ulrich Schmidt, Siek (DE)

(73) Assignee: Cleanaway PET International GmbH, Hamburg (DE)

( * ) Notice: Subject to any disclaimer, the term of this patent is extended or adjusted under 35 U.S.C. 154(b) by 272 days.

(21) Appl. No.: 12/626,147

(22) Filed: Nov. 25, 2009

(65) Prior Publication Data

US 2010/0137463 A1   Jun. 3, 2010

(30) Foreign Application Priority Data

Nov. 26, 2008   (EP) ..................................... 08170031

(51) Int. Cl.
*C08J 11/04* (2006.01)

(52) U.S. Cl. ........... 521/48; 521/40; 521/40.5; 528/480; 528/484; 528/488; 528/489; 528/502 R; 528/502 F; 528/503

(58) Field of Classification Search .................... 521/40, 521/40.5, 48, 48.5; 528/480, 484, 488, 489, 528/502 R, 502 A, 502 C, 502 D, 502 E, 528/502 F, 502, 503; 422/129, 258, 259, 422/260, FOR. 113
See application file for complete search history.

(56) References Cited

U.S. PATENT DOCUMENTS

| | | | | |
|---|---|---|---|---|
| 6,147,129 A | * | 11/2000 | Schwartz, Jr. | 521/48.5 |
| 7,033,167 B2 | * | 4/2006 | Ebel et al. | 432/103 |

FOREIGN PATENT DOCUMENTS

| | | |
|---|---|---|
| DE | 100 32 899 A1 | 7/2000 |
| EP | 1 214 970 A1 | 12/2000 |
| WO | WO 02/102884 A1 | 12/2002 |
| WO | WO 03/020483 A1 | 3/2003 |

OTHER PUBLICATIONS

WPI/Thomson, "XP-002527438," *EPOPROGS*, pp. 1-2, (Sep. 15, 2009).
WPI/Thomson, "XP-002527439," *EPOPROGS*, pp. 1, (Sep. 15, 2009).

* cited by examiner

*Primary Examiner* — Frances Tischler
(74) *Attorney, Agent, or Firm* — Kilpatrick Townsend & Stockton LLP

(57) ABSTRACT

The invention relates to a method for mixing a polyester with caustic material including providing a polyester, preferably PET, mixing the polyester with the caustic material; and heating the mixture in temperature stages defined as a function of a reaction sequence of the reaction between the PET and the caustic material.

11 Claims, 3 Drawing Sheets

POLYESTER WITH CAUSTIC MATERIAL MIXING METHODS AND MIXING REACTORS

CROSS-REFERENCES TO RELATED APPLICATIONS

This application claims priority to European Patent Application No. 08 170 031.2, filed Nov. 26, 2008, the entirety of which is incorporated by reference herein.

BACKGROUND OF THE INVENTION

The present invention relates in general to polyester with caustic material mixing methods and mixing reactors and, in particular, to methods and mixing reactors in which polyester, for example, polyethylene terephthalate (PET), is mixed with a caustic material such as, for example, an alkaline composition.

In particular, the invention relates to such methods and mixing reactors that can be effectively employed in cleaning, decontaminating, and even enhancing the intrinsic viscosity of polyesters. As such, these methods and mixing reactors can be useful in a variety of processes, including separating materials such as waste materials, which contain impurities and/or contaminants, from polyesters and solid-stating of polyesters.

A polyester is a polymeric material, which can be made from the esterification of polybasic organic acids with polyvalent acids. Perhaps the most commonly made and used polyester is polyethylene terephthalate (PET), which can be manufactured by reacting terephthalic acid with ethylene glycol.

Polyesters are currently being used in increasing amounts in various applications. For instance, polyesters are commonly used to make all types of containers, such as beverage and food containers, photographic films, X-ray films, magnetic recording tapes, electrical insulation, surgical aids, such as synthetic arteries, fabrics and other textile products, and many other items.

A challenge in the field of polyester technology is the recovery and recycling of polyesters. Since polyesters can be economically remelted and reformed, many efforts are underway to recycle as much polyester as possible after use. Before polyesters can be recycled, however, it is necessary to separate the used polyesters from other products and materials that may be found mixed with or attached to the polyester. In the current state of the art, many problems have been encountered in attempting to separate polyester from other waste materials. In particular, many prior art processes are not capable of efficiently or economically recovering polyester, when a significant amount of other materials, impurities, and contaminants are present.

The majority of the prior art processes for separating polyesters from other materials have focused on "float"-separation techniques and mechanical recovery processes. In the float-separation technique, polyesters are separated from other materials based on density differences. For instance, materials containing polyester can be combined with water. The less dense materials that float on the water can be easily separated from the submerged polyester. This procedure can be effective in separating polyesters from many low density impurities. However, float-separation techniques cannot be used, if the polyester is found in combination with materials that also sink in the water or that have densities that are comparable to that of polyester.

Examples of the latter include polyvinyl chloride (PVC) and aluminum, both of which do not float in water. In fact, PVC has a density that is very similar to the density of PET and is, therefore, often misidentified as PET. However, both aluminum and PVC must be separated from polyester before it can be reused. In particular, if PET and PVC are remelted together, hydrochloric acid gases are produced that destroy the properties of the resulting plastic material.

Besides failing to separate polyesters from impurities that are heavier than water, the float-separation techniques and conventional washing also fail to remove coatings or other contaminants that commonly adhere to polyester. For example, polyester containers are commonly coated with vapor barrier coatings, saran coatings, and/or inks.

Mechanical recovery processes typically involve washing processes that are used to strip the surface coatings and contaminants off the polyester without any substantial reaction occurring between the polyester and the wash solution. For example, U.S. Pat. Nos. 5,286,463 and 5,366,998 disclose a composition and process for removing adhesives, in particular resins, based on polyvinylidene halide and polyvinyl halide, from polyester films, such as photographic films. In one process the polyester films are mixed with a reducing sugar and a base, in order to remove the adhesive polymeric resin from the film. Then an acid is added to precipitate the resin, which can then be separated from the polyester film.

Meanwhile the focus of recovering polyester from the recycling of waste has turned to the chemical conversion of the polyester into usable chemical components. In such processes alkaline materials have been employed. For instance, U.S. Pat. Nos. 5,395,858 and 5,580,905 disclose processes for recycling polyesters. In these processes the polyesters are reduced to their original chemical reactants.

This process includes the steps of combining the polyester material with an alkaline composition, in order to form a mixture. The mixture is heated to a temperature that is sufficient to convert the polyester to an alkaline salt of a polybasic organic acid and a polyol. During the process the alkaline composition is added in an amount sufficient to react with all of the polyester that is present in the mixture. The foregoing process provides for the complete chemical conversion/saponification of the polyester material. However, this can add a substantial cost to the overall process, since the polyester must ultimately be reformed.

U.S. Pat. No. 3,590,904 discloses a process for removing polymeric sublayers from polyester film bases, which bear at least one vinylidene halide co-polymeric layer on at least one surface of the base, by making contact with the polyester base material with hot alkaline glycol, in which up to 5 percent by weight or more of water can be present, in order to induce a reaction between the hot glycol and the substratum layers for cleaning the polyester.

WO 00/188830 A1 discloses that a reaction of polyesters, such as PET, with alkaline compositions in a reactive environment that is at least substantially free of water can allow the cleaning, decontamination and even an improvement in the intrinsic viscosity of polyesters. This innovation is in direct contrast to a long-held belief in the field of polyester recycling that polyesters must necessarily degrade in the presence of caustic materials.

In one aspect WO 00/18830 A1 relates to a method for treating a polyester, which includes the combining of a polyester with an alkaline composition in an amount, which is effective, in order to coat at least a portion of the polyester. Then during the actual reaction step the polyester can be heated to a temperature which is not greater than the melting point of the polyester. The aforementioned actual reaction step is conducted in an environment that is at least substantially free of water.

This technique, which is known in the prior art, can be used in order to improve the properties of polyester products, which are obtained from processes for recovering or recycling polyester containing materials, which contain contaminants and/or impurities. In this regard a recovery method includes mixing the polyester containing material with an alkaline composition, where the alkaline composition is employed in an amount, which is effective in order to react with a portion of the polyester and the polyester containing material, followed by heating the mixture in the actual reaction step to a temperature, which is effective in order to saponify a portion of the polyester, but is insufficient to melt the polyester. Then the polyester can be physically cleaned and decontaminated. A key aspect of this known process is that the actual reaction step is carried out in an environment, which is at least substantially free of water. Depending on, for example, the duration of the process, the resulting polyester may show an improved intrinsic viscosity (i.v.) and color. Prior to reuse, the polyester can be treated by techniques, for example, washing, that are recognized in the state of the art. Since this known technique can be used to enhance the intrinsic viscosity of the polyester, it can also be used, in fact, in a method for forming, for example, solidifying, polyesters.

BRIEF SUMMARY OF THE INVENTION

One object of the present invention is to improve the methods and reactors described above.

The present invention comprises, inter alia, the knowledge that under some circumstances the aforesaid method, disclosed in WO 00/18830 A1, can work even better, in particular during the reaction of the polyester with the caustic alkaline material.

Adherences of polyester material in a thickness of approximately 5 cm can form on the inside of the shell of a mixing reactor, used for mixing. Furthermore, the present invention recognizes that owing to the higher friction of the polyester material—as a consequence of the steadily decreasing gap size in the material in the direction of the inside of the shell of the mixing reactor—the result is a higher production of fines. At the same time the invention has recognized that owing to the insulating property of the aforementioned adherences or deposits of polyester material on the inside of the shell of the mixing reactor, the heat input of the heated wall of the mixing reactor into the interior of the mixing reaction is reduced.

Moreover, the invention recognizes that the resulting necessary routine removal of the adherences leads to more downtimes of the mixing reactor that is used for the mixing. However, even between the downtimes the residual moisture of the polyester material at the mixing reactor outlet is too high, in order to produce high grade recycling material in the subsequent actual reaction step in WO 00/18830 A1.

Moreover, owing to the aforesaid effects the consumption of caustic material is only less than 95%, so that there is still more than 5% free caustic material in the reactor. In this case the invention has recognized that owing to the heat input, which is reduced because of the adherences, it is necessary to use either an excessive amount of energy to heat the mixing reactor; or in the event that a standard amount of energy is used, the maximum material temperature in the mixing reactor is maximally 85° C., a feature that is responsible for the too low consumption of caustic material of less than 95%.

Furthermore, the invention has recognized that not until the temperature exceeds 95° C. is a caustic material consumption of more than 95% possible.

Various embodiments of the invention comprise, in particular, at least one of the following features.

Prior to heating, the polyester is ground preferably to a flake size ranging from about 0.005 m to about 0.01 m. This feature has proven to be advantageous for the quality of the end product for all process steps.

After grinding, the polyester is subjected to a sink-float-separation process. After grinding and before the separation process, the polyester can be subjected to at least one cleaning step.

After the sink-float-separation process, the polyester is dried.

The polyester is heated in a reactor; said reactor is preheated preferably before the addition of the polyester, preferably to a temperature between 95° C. and 165° C., more preferably to a temperature between 100° C. and 130° C. Owing to the preheating process, the aforementioned drawbacks with respect to the state of the art are avoided.

The polyester is heated in three temperature stages. Owing to the three stage preheating process, the aforementioned drawbacks with respect to the state of the art are avoided, so that there is no need for an excessive (and, as a result, no longer economical) number of steps.

In the first stage the polyester is heated preferably for about 5 to 15 minutes, more preferably for about ten minutes, to a temperature between 95° C. and 120° C., preferably about 110° C.; in the second stage, preferably for about 5 to 15 minutes, more preferably for about ten minutes, to a temperature between 110° C. and 130° C., preferably about 120° C.; and, if on hand, in the third stage, preferably for about 5 to 15 minutes, more preferably for about ten minutes, to a temperature between 120° C. and 140° C., preferably about 130° C. Owing to these predefined temperature windows, the aforementioned drawbacks with respect to the state of the art are avoided even more.

As the temperature is raised, the mixing of the polyester with the caustic material is started, preferably carried out. As a result, the aforementioned drawbacks with respect to the state of the art are avoided.

The time between the start and the end of the heating of the polyester ranges from 5 to 45 minutes, preferably from 10 to 30 minutes, more preferably from 10 to 15 minutes, preferably at an essentially constant flow rate of the polyester. As a result, the aforementioned drawbacks with respect to the state of the art are avoided.

The polyester stays in the heating step until the residual moisture is less than 3%, preferably less than 2%, more preferably less than 1.6%. As a result, the aforementioned drawbacks with respect to the state of the art are avoided.

The polyester stays in the heating step until more than 95%, preferably more than 98%, more preferably more than 99%, of the free caustic material, determined preferably by phenolphthalein titration, is consumed. As a result, the aforementioned drawbacks with respect to the state of the art are avoided.

The heating of the polyester is carried out in a reactor with a throughput of at least 2,000 kg/h, preferably at least 2,500 kg/h. As a result, the aforementioned drawbacks with respect to the state of the art are avoided.

In the respective stages a homogeneous temperature distribution of the temperature is set in the zones, which are provided for the respective stages in a reactor, which is used to carry out the method. As a result, the aforementioned drawbacks with respect to the state of the art are avoided.

In order to conduct the heating and the mixing, a twin shaft mixing screw reactor is used as a reactor. As a result, the aforementioned drawbacks with respect to the state of the art are avoided.

Owing to the use of a sawtooth profile for the screw shafts, which are a part of the mixing screw of the twin shaft mixing screw reactor and which are provided preferably with a screw pitch of about 100 mm, more preferably meshing with one another, the inner wall of the twin shaft mixing screw reactor that faces the polyester is kept essentially free of adherences of the polyester. As a result, the aforementioned drawbacks with respect to the state of the art are avoided.

The present invention is focused, in particular, on the recovery of food containers and beverage containers made from PET. Owing to the process of the present invention, polyesters can be better recovered and reused from final consumer waste, even when the polyesters are found mixed with polyvinyl chloride or aluminum, adhering to various coatings, mixed or entrained with various organic and inorganic compounds. Such materials are currently still being disposed of to a large extent in landfills or are being incinerated after a single use due to a lack of an economical process that will recover the polyester.

The present invention is capable of providing significant advantages over the more traditional processes that are employed within the state of the art. In particular, the process is capable of providing a recycled PET product having improved properties, for example, a high degree of purity, good color and possibly even an improved intrinsic viscosity. In addition, the present invention is capable of providing these products at an acceptable yield and at a lower processing cost, since it does not require "re-polymerization" of the monomers in contrast to typical depolymerization processes.

In addition to the recovery, processes for forming polyesters including, for example, known solid-stating processes, can be improved through the use of the present inventive treatment method.

The method of this invention is capable of providing a number of significant advantages. For example, it is capable of cleaning and/or decontaminating polyester.

In fact, owing to the present invention the polyester can be cleaned and/or decontaminated to a level, which is sufficient to meet various national guidelines, for example, FDA, guidelines.

Of course, it should be recognized that the desired level of cleaning or decontamination is dependent upon the ultimate end use of the polyester.

The actual reaction step (called "heating/reacting" in the figure) can also be used to increase the intrinsic viscosity of the polyester. Up to this point, the actual reaction step (called "heating/reacting" in the figure) in the presence of a dry atmosphere is carried out for a period of time that is sufficient to enhance the intrinsic viscosity of the polyester. A minimal duration is dependent on, for example, the water content of the environment and can be as short as 10 to 15 minutes.

In light of the above advantages, the inventive technique can be employed in a number of applications, including both forming, for example, solid-stating, and also the recycling of polyesters.

One particular application, in which the inventive method can provide significant advantages, also involves the recovery of polyester materials. This and other aspects of the invention are explained in detail in the following description in conjunction with the accompanying drawings.

DETAILED DESCRIPTION OF THE INVENTION

Figure 1:
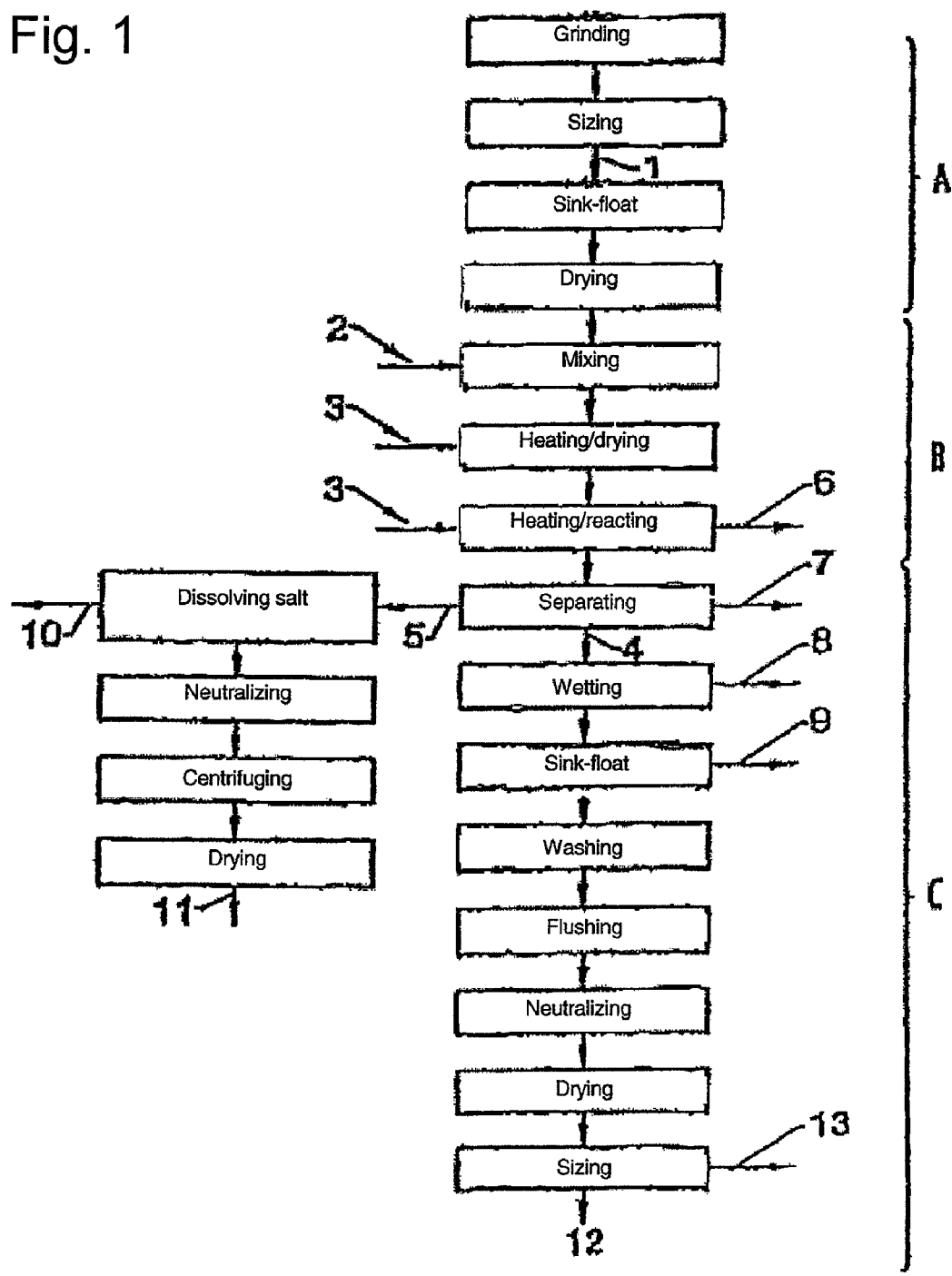
FIG. 1 illustrates a flow diagram of a recycling process for PET, according to one embodiment of the invention.

As discussed above, the present invention relates to a technique for the heating of the polyester, which is mixed with a caustic material, in order to carry out the actual treatment of polyesters that includes the decontamination and recycling of polyesters, such as PET, by reacting the polyester with the caustic material, consisting of alkaline materials, at temperatures that are defined in stages.

A first aspect of the invention comprises heating the polyesters prior to mixing the polyester with a caustic material, for example, with an alkaline composition, such as sodium hydroxide. In contrast to the known method of the WO document, the polyester is heated with the caustic material.

In a preferred embodiment of the invention, upon completion of the mixing process, the actual reaction environment is at least substantially free of water. Thus, the process, which precedes the inventive method, can also include the removal of any moisture that is present, for example, by drying, prior to the step by step heating, according to the present invention.

As an introduction, some concepts are defined in detail below.

By "at least substantially free" it is meant that the amount of water present in the environment is less than that which results in a degradation of the polyester during heating procedure. This amount is typically not more than 80 ppm (−40° C. dew point), preferably not more than 10 ppm, more preferably not more than 5 ppm (−62° C. dew point). There is no theoretical minimum, since the amount of water can be as low as 1 ppm of the environment or even less.

A polyester relates, for example, to an esterification or reaction product between a polybasic organic acid and a polyhydric alcohol. It is assumed that any known polyester or copolyester may be used in the invention. The inventive process is oriented, in particular, towards a class of polyesters that are referred to herein as polyol polyterephthalates, in which the terephthalic acid serves as the polybasic organic acid.

As used herein, a polybasic organic acid refers to any organic acid having two or more carboxyl groups (—COOH). Most polyesters are derived from dibasic acids or, in other words, from dicarboxylic acids. Polybasic acids can have a linear or a cyclic conformation. Examples of linear polybasic acids that can be used to produce polyesters include the aliphatic dicarboxylic acids, and in particular the aliphatic dicarboxylic acids having up to ten carbon atoms in their chains. These acids include adipic acid, glutaric acid, succinic acid, malonic acid, oxalic acid, pimelic acid, suberic acid, azelaic acid, sebacic acid, lameic acid, and fumaric acid.

Cyclic polybasic organic acids include, on the other hand, the isocyclic dicarboxylic acids. The acids are known as phthalic acids, isophthalic acids, terephthalic acids and naphthalene dicarboxylic acids; and, in particular, terephthalic acid is used to produce PET, which is perhaps the most commercially available polyester.

As described above, a polybasic organic acid is combined with a polyhydric alcohol, in order to produce a polyester. Polyhydric alcohols are compounds that exhibit at least two hydroxyl groups. Many polyesters are synthesized using a polyhydric alcohol, which exhibits two hydroxyl groups, which are referred to as diols. Diols are normally prepared from an alkene by the net addition of two hydroxyl groups to the double carbon bond in a method, which is known as hydroxyl group addition. Polyhydric alcohols are commonly referred to as glycols and polyalcohols. Examples of polyhydric alcohols, which are used to produce polyesters, include ethylene glycol, propylene glycol, butylene glycol, and cyclohexane dimethanol.

The following table contains an exemplary non-exhaustive list of commercially available polyesters, according to the invention. For each polyester, the corresponding polybasic organic acid and polyhydric alcohol are provided.

| POLYESTER | POLYBASIC ORGANIC ACID | DIOL |
| --- | --- | --- |
| Polyethylene terephthalate | Terephthalic acid | Ethylene glycol |
| Polybutylene terephthalate | Terephthalic acid | Butylene glycol |
| PETG copolyester | Terephthalic acid | Cyclohexane dimethanol and ethylene glycol |
| PBTG copolyester | Terephthalic acid | Cyclohexane dimethanol and butylene glycol |
| Polycyclohexane dimethanol terephthalate | Terephthalic acid | Cyclohexane dimethanol |
| PEN polyester | Naphthalene dicarboxylic acid | Ethylene glycol |

The polyester is typically in a discrete form, for example, finely divided or pelletized. Examples of suitable particles include pellets having a size ranging from 1 to 15 mm and flakes having a size ranging from 3 to 20 mm, preferably about 5 to 10 mm. However, the precise form is not critical for the present invention insofar as almost any particle size of the polyester is suitable for being coated by the caustic material.

The caustic material, which is employed in the invention, can be any caustic material, which is recognized in the state of the art. Specific examples of caustic materials include alkaline compositions, such as sodium hydroxide, calcium hydroxide, magnesium hydroxide, potassium hydroxide, lithium hydroxide, and mixtures thereof.

The amount of caustic material employed is that amount that is needed to coat at least a portion of the polyester. Preferably the caustic material is introduced in an amount that is sufficient to coat the entire polyester. The precise amount of caustic material depends on the level of impurities present and the cleaning required to effectively remove a particular amount of impurities.

At this point one example of the recovery process, in which the present invention can be used, will be described in terms of a preferred example, which is depicted in the drawings.

As depicted in the drawing of FIG. 1, the recycle process typically comprises three phases, that is, a pre-treatment of the polyester, which is generally shown as A; a reaction of the PET, which is generally shown as B; and a separation and post-treatment of the reaction products that is shown as C.

The first of these phases comprises a pre-treatment of the PET. In this respect, prior to making contact with an alkaline composition, the polyester 1 can be, if desired, comminuted or ground to a particular size. Sizing of the flake is done solely for the purpose of facilitating handling.

Also prior to being combined with the alkaline composition, the materials, which contain the polyester, can be immersed in water or some other fluid, in order to separate the less dense or lighter materials from the heavier materials, including the polyester. Such techniques are well known in the state of the art. In particular it is known that polyester sinks in water, while other polymers, such as polyolefins, and paper products are water buoyant. Thus, the lighter materials can be easily separated from the heavier materials, when they make contact with a fluid. Subjecting the materials to a sink/float separation step prior to making contact with the alkaline composition not only reduces the quantity of materials that is processed, but also removes the materials from the polyester prior to further processing.

When the polyester is subjected to a step, which includes water, for example, a sink/float separation step, the polyester can be dried prior to being combined with the alkaline material. This drying, which occurs at temperatures of not more than 160° C., preferably 130 to 160° C., can be performed by any method that is known in the prior art.

The next phase of the process is shown as B in FIG. 1. It comprises mixing and heating the polyester, together with the caustic material 2. When, for example, with the caustic material, moisture is introduced again into the material, the material can be dried (called "heating/drying" in the figure) after the mixing and before the heating. The drying is done preferably at a temperature of not more than 160° C., more preferably at a temperature ranging from 130 to 160° C.

The environment, in which the actual reaction step (called "heating/reacting" in the figure) is carried out after the mixing, should be at least substantially free of water. Due to cost considerations, an environment with dry air is preferred. However, an inert atmosphere, such as nitrogen, argon or the like, can also be used effectively.

The temperature, to which the material is heated in the actual reaction step, depends on the reaction sequence of the reaction. This means that theoretically the treatment can be carried out at temperatures up to nearly the melting point of the polyester. However, the preferred temperatures for the actual multi-staged reaction step of the invention (called "heating/reacting" in the figure) are not at 200 to 245° C., known from the prior art. Rather the temperatures, according to the invention, in the actual reaction step are not present in one stage, but rather in a plurality of stages. The definition of the temperatures of the individual stages is defined, according to the invention, as a function of a reaction sequence of the reaction between the PET and the caustic material. Such a definition can be specified from the beginning, if a specific reaction sequence was carried out once in the manner of a trial and in this way specific temperature stages were defined. However, in an additionally preferred embodiment the individual temperature stages can also be set in accordance with a classical control circuit, which sets in real time the temperature of each individual stage as a function of a reaction sequence between the PET and the caustic material, in order to have an optimal residual moisture of less than 1.6% in the reaction mixture at the end of the last temperature stage and/or—as an alternative or cumulative condition—the temperature stages can be set in each case in such a manner that more than 99% of the free caustic material, which is determined by phenolphthalein titration, is consumed. In detail, the invention has found that the optimal temperature windows for the individual stages are in a range between 95° C. and 140° C. Furthermore, it has been determined that an ascending configuration of the temperature curve between the individual stages is preferred. The precise temperature ranges, which are preferred, are given below in even greater detail. The core feature with respect to controlling the temperature in the present invention is, above all, that a controlled reaction sequence of the reaction between the caustic material and the contaminated PET over time is possible by means of the graduated temperature control.

The illustrated embodiment of the invention can comprise, in particular, at least one of the following steps.

Prior to heating, the polyester is ground preferably to a size of flake that ranges from about 0.005 m to about 0.01 m (see "grinding" step).

After mixing in a reactor 2 (see FIGS. 2 and 3), the polyester is heated. Said reactor 2 is preheated to a temperature ranging from 95° C. to 165° C., preferably to a temperature ranging from 100° C. to 130° C.

In zones 4a, 4b, 4c (see FIGS. 2 and 3) the polyester is heated in three temperature stages.

In the first stage of zone 4a the polyester is heated for about ten minutes to a temperature between 95° C. and 120° C., preferably about 110° C.; in the second stage of zone 4b, for about ten minutes to a temperature between 110° C. and 130° C., preferably about 120° C.; and in the third stage of zone 4c for about ten minutes to a temperature between 120° C. and 140° C., preferably about 130° C.

During the first heating stage, the mixing of the polyester with the caustic material has already started. The actual reaction process of the polyester with the caustic material is carried out in its entirety in the period, in which the mixture reacts in the three temperature stages.

The time between the start and the end of the heating of the polyester ranges from 5 to 45 minutes, preferably between 10 and 30 minutes, more preferably between 10 and 15 minutes, preferably at an essentially constant flow rate of the polyester.

The polyester stays in the 3 stage heating and reacting step until the residual moisture is less than 3%, preferably less than 2%, more preferably less than 1.6%.

The polyester stays in the 3 stage heating and reacting step until more than 95%, preferably more than 98%, more preferably more than 99%, of the free caustic material, determined preferably by phenolphthalein titration, is consumed.

During the heating and mixing, the polyester is conveyed in a reactor with a throughput of at least 2,000 kg/h, preferably at least 2,500 kg/h.

In the respective zones 4a, 4b, 4c of the reactor 2, a homogeneous temperature distribution of the temperature is set.

Figure 2:
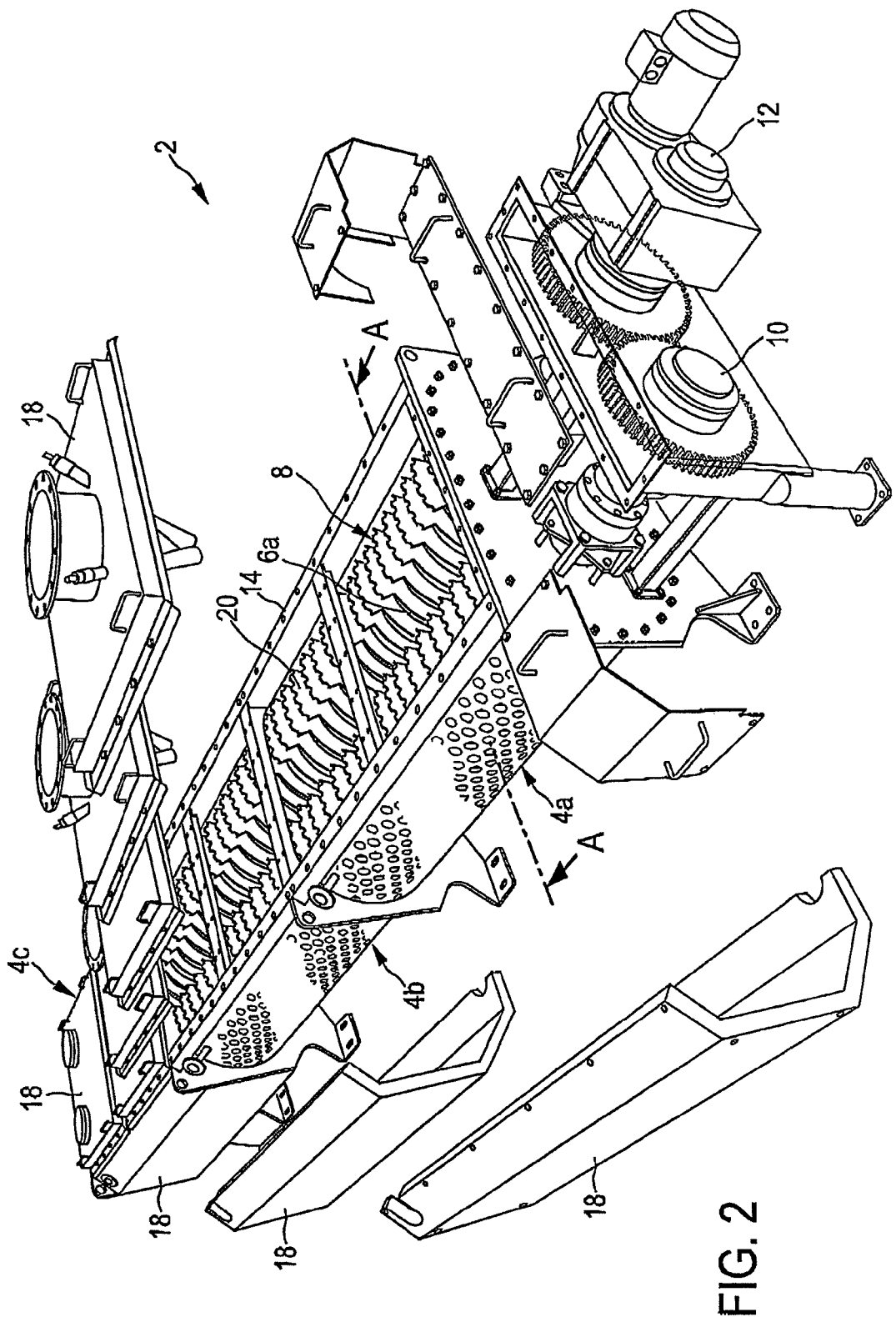
FIG. 2 is a perspective schematic drawing, which is depicted to some extent as an exploded drawing, for carrying out a method, according to the invention.
Figure 3:
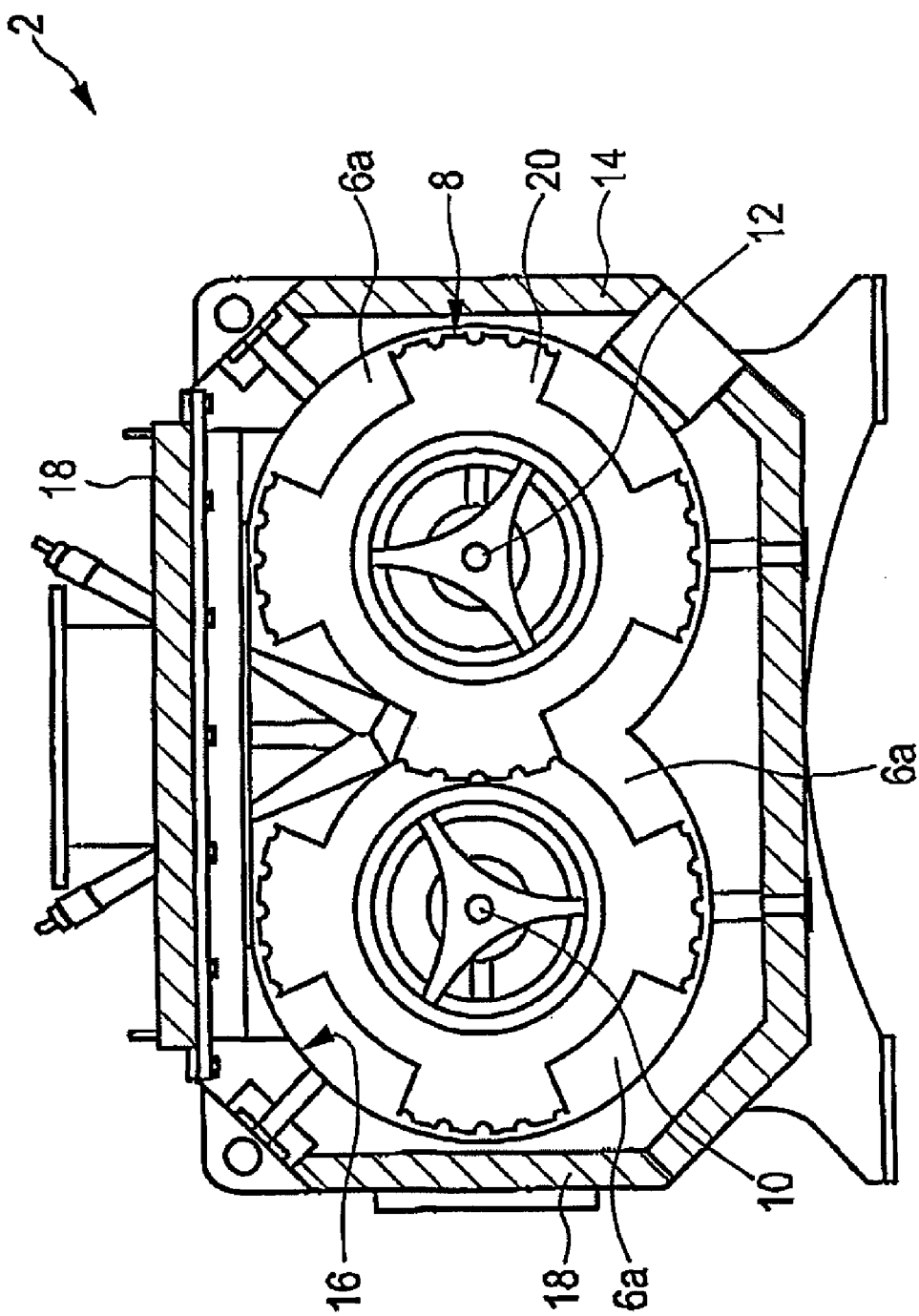
FIG. 3 is a sectional drawing of the reactor in FIG. 2.

In order to conduct the reaction process, provided with the above described 3 temperature stages, a twin shaft mixing screw reactor 2 is used (depicted in the FIGS. 2 and 3). Owing to the use of a sawtooth profile 8 for the screw shafts 10, 12, which are a component of the mixing screw 14 of the twin shaft mixing screw reactor 2 and which mesh with one another and which are provided with a screw pitch of about 100 mm, the inner wall 16 of the twin shaft mixing screw reactor 2 that faces the polyester is kept essentially free of adherences of the polyester.

Therefore, the section B in FIG. 1 comprises the staged heating steps of the invention, including the possibility of heating in a dry air environment.

Consequently the mixing can be followed by heating/drying and then a subsequent introduction of the mixture, which has been dried in this manner, into an additional reaction chamber 6a of the reactor 2. A hot dry air stream 3 can also be introduced during the heating steps in the reaction chamber 6a, in order to provide a proper water free environment. During the heating/reaction step, a volatile component containing stream 6 can be removed from the reaction chamber 6a.

The actual temperature, to which the mixture in the reaction chamber 6a is heated, depends on a number of factors, including the particular impurities and/or contaminants that are still present in the mixture in the reaction chamber 6a.

The equipment and device, which are used during the process in the reaction chamber 6a, can also vary. However, in one embodiment, depicted in FIGS. 2 and 3, a reactor 2, according to the invention, is used in the form of a twin shaft mixing screw reactor 2 for carrying out the heating and mixing. In this reactor 2 a sawtooth profile 8 is used preferably for the screw shafts 10, 12 of the mixing screw 14 of the twin shaft mixing screw reactor 2. These screw shafts 10, 12 mesh with one another and are provided with a screw pitch of about 100 mm. Owing to the use of such a twin shaft mixing screw reactor 2, the mixture composed of PET and caustic material is homogenized very well. The three heating zones 4a, 4b, 4c, which are provided for the three temperature states, in the reactor 2 and also the two screw shafts 10, 12, which totally extend over the three heating zones 4a, 4b, 4c, and are a component of the twin screw 2, are steam heated and can be controlled individually and separated with respect to their temperature, in order to ensure the desired temperature for each temperature stage, correspondingly also for each temperature stage. In addition, the twin shaft mixing screw reactor 2 of the invention exhibits a double shell 18. This double shell is designed preferably in such a manner that the mixing screw 14 does not fall below the known TÜV [Technical Supervisory Organization] monitoring duties, which are relevant to the person skilled in the art and that pertain to such pressure tanks. Therefore, the screw 14 is constructed in such a way that it provides for an optimized heat transfer to the screw flight 20 and achieves a homogeneous distribution in the respective temperature stage. Owing to the screw pitch of 100 mm, an elevated heat exchange surface is provided, in order to achieve the aforesaid optimized heat transfer. In addition, it has turned out, according to the invention, that owing to the aforesaid screw pitch of about 100 mm at the aforesaid temperature ranges for the individual stages 4a, 4b, 4c between 95° C. and 140° C., it is possible to achieve in total a sufficient residence time of about 10 minutes. In addition, the inventive design of the reactor 2 is characterized by a low power consumption of maximally 3 kW for driving the reactor 2.

The stage C of the process comprises the separation of the various reaction products. In this recovery process that portion of the polyester that is saponified is converted into a polyhydric alcohol and an acid salt. For instance, when saponifying PET with sodium hydroxide, the PET is converted into ethylene glycol and disodium terephthalate. The polyhydric alcohol, which is formed during the process, either remains as a liquid in the mixture or is evaporated out of the reaction, if the mixture is heated above the boiling point of the polyhydric alcohol.

The first step of the separation stage comprises separation of the polyester 4, the acid salt 5, and any fines 7. Then these components are handled individually.

The formed acid salt or metal salt, such as disodium terephthalate, dissolves in the water, when the heated materials are washed. If it is desired, the metal salt can be recovered from the wash water at a later date. For instance, if the acid salt is a terephthalate, the wash water can be filtered in a first step, in order to remove any undissolved impurities and contaminants, which are indicated by the stream 10. Then in a subsequent step the wash water can be acidified, in order to cause the terephthalic acid to precipitate. In order to acidify the solution, a mineral acid, such as hydrochloric acid, phosphoric acid or sulfuric acid or an organic acid, such as acetic acid or carbonic acid, can be added to the solution. As soon as the terephthalic acid precipitates, the terephthalic acid can be filtered, washed and dried, a process that leaves a relatively pure product 11.

The polyester is also treated prior to reuse. A first step in the separation stage of the recovery process comprises washing of the polyester material.

The washing step, which is suitable for use in connection with the resulting PET, can include any washing step or any washing device, which is known in the state of the art. However, it is preferred that a washing step with high shear forces be used, in order to facilitate the removal of materials, such as oligomers, and other organic and inorganic compositions from the surface of the PET. Such washers with high shear forces are commercially available in the state of the art from manufacturers, such as Reg-Mac or Sorema.

Moreover, the washing steps include additionally a neutralization of any remaining alkaline materials through the addition of a suitable acid, such as phosphoric acid.

Other steps in the treatment of the polyester after the separation depend on the contaminants and/or impurities in the starting compositions. At this time the invention can effectively recover polyester from a variety of contaminants and/or impurities.

For example, the method can be used to separate polyesters from polyvinyl chloride. This aspect of the process comprises the heating of the mixture of alkaline composition and the polyester materials in a reaction chamber to a temperature that is sufficient to dechlorinate at least a portion of the polyvinyl chloride, as a result of which the polyvinyl chloride is converted into a form that is separable from the polyester. However, the mixture in the reaction chamber is heated at most to a temperature that is insufficient to melt the polyester.

In order to separate the dechlorinated polyvinyl chloride from the polyester, the mixture, after being heated in the reaction chamber, can be combined with a fluid, such as water. When placed in water, the polyester will sink, while the dechlorinated polyvinyl chloride will float. Thus, a stream 9, which contains, for example, the dechlorinated polyvinyl chloride, can be easily separated from the polyester. Optionally, gas bubbles, which will adhere to the dechlorinated polyvinyl chloride, can be passed through the water, in order to facilitate the separation.

In addition, discolored PVC may be separated by color sorting techniques, which are known in the prior art. Examples of commercially available equipment include those produced by manufacturers, such as SRC, Satake and MSS.

The process in the reaction chamber 6a can also effectively separate polyesters from small particles, that is, on the order of microns, of aluminum and the like. This aspect includes heating the mixture of waste material and alkaline composition in the reaction chamber 6a to a temperature that is sufficient for the alkaline composition to react with at least a portion of the metal without melting the polyester. The byproduct of the reaction between the alkaline composition and the aluminum can be removed in the subsequent washing steps.

Another aspect of the recovery process in the reaction chamber 6a comprises removing the coatings and/or entrained organic and inorganic compounds from polyesters. In this context the mixture of polyester and caustic material in the reaction chamber 6a is heated to a temperature that is sufficient to saponify the outer surface of the polyester, as a result of which the coatings are removed from the polyester. The mixture is heated in the reaction chamber 6a to a temperature that is insufficient to melt the polyester.

The recovery process in the reaction chamber 6a can run continuously, thus, can be carried out with continuously moving particles, or it can be set up as a batch system. Practically any polyester material can be processed. Preferably the polyester materials are recovered from the solid waste stream, thus alleviating many environmental concerns and disposal problems.

The above description is illustrative and not restrictive. Many variations of the disclosure will become apparent to those skilled in the art upon review of the disclosure. Such variations should not be regarded as departures from the spirit and scope of the invention. The scope of the invention should be determined with reference to the following claims along with their full scope of equivalents.

What is claimed is:

1. A method for mixing a polyester with a caustic material, comprising:
   providing a polyester;
   drying the polyester;
   mixing the dried polyester with the caustic material to form a mixture; and
   heating the mixture in multiple temperature stages defined as a function of a reaction sequence of the reaction between the polyester and the caustic material,
   wherein in a first of the temperature stages the polyester is heated to a temperature between 95° C. and 120° C., in a second of the temperature stages the polyester is heated to a temperature between 110° C. and 130° C., and in a third of the temperature stages the polyester is heated to a temperature between 120° C. and 140° C., and
   wherein a reactor heats the mixture of the polyester and caustic material, the reactor including a twin shaft mixing screw for mixing of the mixture of polyester and caustic material, screw shafts that mesh with one another being used for the twin shaft mixing screw, at least one of the screw shafts having a sawtooth profile, and wherein the inner wall of the reactor is kept essentially free of adherences of the polyester.

2. The method of claim 1,
   wherein prior to heating, the polyester is ground to a flake size ranging from about 0.005 m to about 0.01 m.

3. The method of claim 1,
   wherein the reactor is preheated before the addition of the polyester to the reactor.

4. The method of claim 1,
   wherein the time between the start and the end of the heating of the polyester ranges from 5 to 45 minutes.

5. The method of claim 1,
   wherein the polyester stays in the heating step until the residual moisture is less than 3%.

6. The method of claim 1,
   wherein the polyester stays in the heating step until more than 95% of the free caustic material.

7. The method of claim 1,
   wherein the heating of the polyester is carried out in a reactor with a throughput of at least 2,000 kg/h.

8. The method of claim 1,
   wherein in the respective stages a homogeneous temperature distribution of the temperature is set in the zones which are provided for the respective stages of the reactor which is used to carry out the method.

9. The method of claim 1, wherein the screw shafts are provided with a screw pitch of about 100 mm and mesh with one another.

10. The method of claim 1,
    wherein the polyester is heated for about ten minutes in the first stage, for about ten minutes in the second stage, and for about ten minutes in the third stage.

11. The method of claim 1,
    wherein the polyester is heated to a temperature of about 110° C. in the first stage, to a temperature of about 120° C. in the second stage, and to a temperature of about 130° C. in the third stage.

* * * * *